United States Patent [19]

Strong

[11] Patent Number: 5,799,693
[45] Date of Patent: Sep. 1, 1998

[54] POWER STEERING CONTROL VALVE WITH NOISE REDUCTION

[75] Inventor: Daniel J. Strong, Clinton Township, Mich.

[73] Assignee: TRW Inc., Lyndhurst, Ohio

[21] Appl. No.: 762,597

[22] Filed: Dec. 9, 1996

[51] Int. Cl.⁶ .............................. F15B 9/10; F16K 47/02
[52] U.S. Cl. ..................... 137/625.23; 91/375 A
[58] Field of Search ................. 91/375 A; 137/625.23

[56] References Cited

U.S. PATENT DOCUMENTS

| | | |
|---|---|---|
| 3,746,045 | 7/1973 | Bunker et al. . |
| 4,445,422 | 5/1984 | Bishop . |
| 4,461,321 | 7/1984 | Bacardit . |
| 4,577,660 | 3/1986 | Haga et al. . |
| 4,852,462 | 8/1989 | Uchida et al. . |
| 4,860,635 | 8/1989 | Uchida et al. . |
| 5,244,012 | 9/1993 | Tabata et al. . |
| 5,263,512 | 11/1993 | Emori et al. . |
| 5,417,244 | 5/1995 | Behrens et al. . |
| 5,447,209 | 9/1995 | Sasaki et al. ............ 137/625.23 X |
| 5,458,153 | 10/1995 | Roeske . |
| 5,562,124 | 10/1996 | Behrens et al. . |
| 5,582,207 | 12/1996 | Gilbert et al. ............ 137/625.23 |

FOREIGN PATENT DOCUMENTS

| | | | |
|---|---|---|---|
| 59-58278 | 4/1984 | Japan | 137/625.23 |

*Primary Examiner*—Gerald A. Michalsky
*Attorney, Agent, or Firm*—Tarolli, Sundheim, Covell, Tummino & Szabo

[57] ABSTRACT

A hydraulic fluid control valve (18) includes first and second valve members (60, 62) which are rotatable relative to each other about an axis (23). The valve members (60, 62) define hydraulic fluid flow orifices (110) which are spaced apart circumferentially about the axis (23). The orifices (110) are variable in size such that an orifice (110a) enlarges when a pair of adjacent orifices (110b and 110c) constrict upon relative rotation of the valve members from neutral positions. The pair of constricting orifices (110b, 110c) initially constrict at unequal rates, and subsequently constrict at equal rates until reaching fully constricted conditions.

9 Claims, 6 Drawing Sheets

Fig.11

POWER STEERING CONTROL VALVE WITH NOISE REDUCTION

BACKGROUND OF THE INVENTION

1. Technical Field

The present invention relates to a hydraulic fluid control valve for a power steering gear.

2. Description of the Prior Art

A known hydraulic fluid control valve for a power steering gear includes a valve core rotatable within a valve sleeve. The core and the sleeve control the pressure of hydraulic fluid flowing through the valve between a pump, a reservoir, and a pair of opposed fluid chambers in a hydraulic motor. When the core and the sleeve are in neutral positions, the hydraulic fluid pressures in the opposed fluid chambers are equal. When the core and the sleeve are rotated from the neutral positions, a plurality of lands and grooves on the core and the sleeve cooperate to increase the hydraulic fluid pressure in one of the opposed fluid chambers, and thereby to provide hydraulic power steering assist in the steering gear.

The lands and grooves in the core and the sleeve define orifices through which the hydraulic fluid flows through the valve. Changing pressure differentials at these orifices tends to generate noise in the steering gear. It is desirable to minimize this noise.

SUMMARY OF THE INVENTION

In accordance with the present invention, a hydraulic fluid control valve comprises first and second valve members which are rotatable relative to each other about an axis. The valve members comprise means for defining a plurality of hydraulic fluid flow orifices which are spaced apart circumferentially about the axis. The orifices are variable in size such that an orifice enlarges when a pair of adjacent orifices constrict upon relative rotation of the valve members from neutral positions. The pair of constricting orifices initially constrict at unequal rates, and subsequently constrict at equal rates until they reach fully constricted conditions.

A valve constructed in accordance with the present invention generates a relatively low level of noise as hydraulic fluid flows through the orifices. Noise is maintained at a relatively low level by causing certain orifices to constrict at varying rates in accordance with the present invention.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
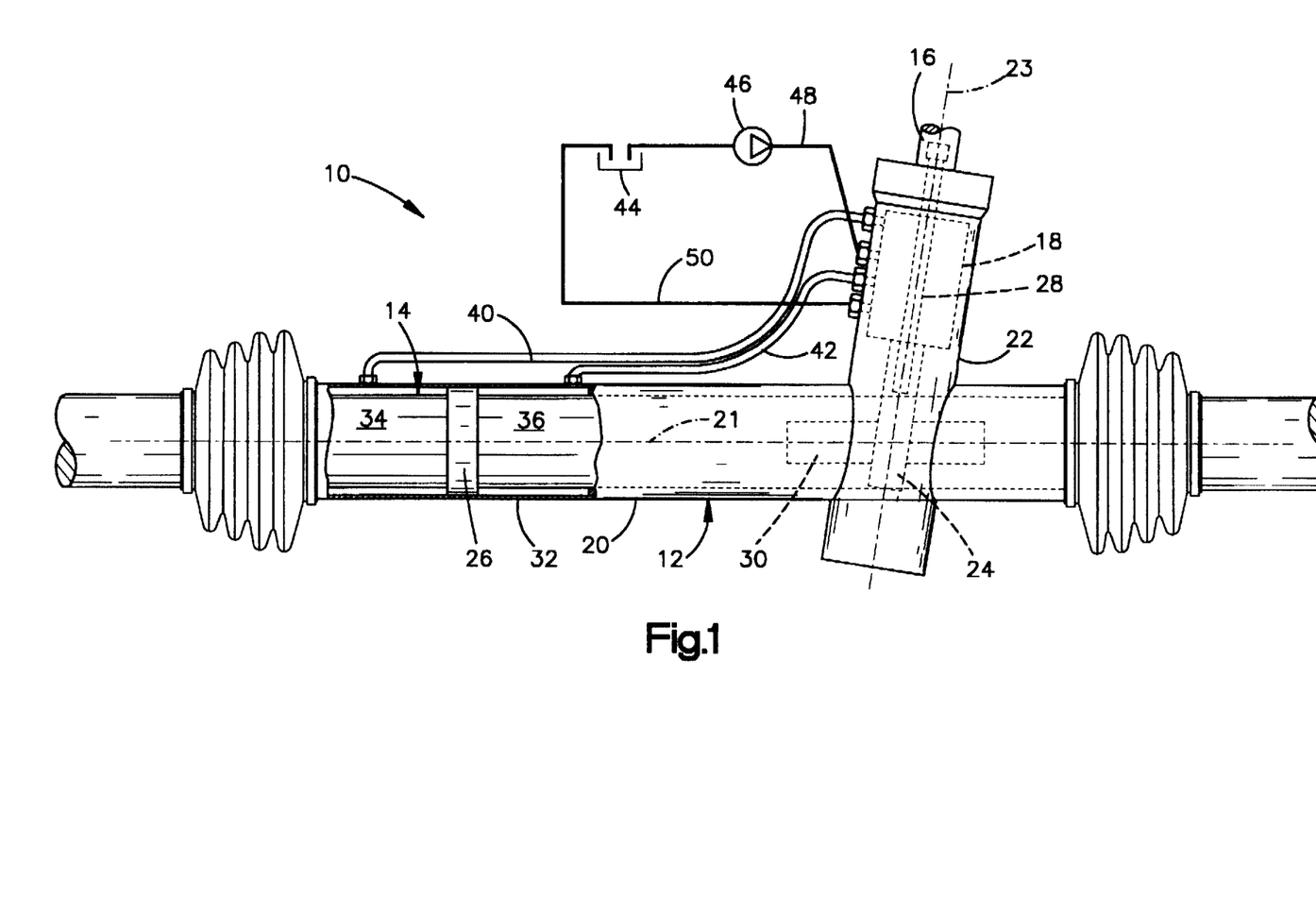
FIG. 1 is a view of an apparatus comprising a preferred embodiment of the present invention.

A hydraulic power steering gear 10 comprising a preferred embodiment of the present invention is shown in FIG. 1. The steering gear 10 is a hydraulically-assisted rack and pinion steering gear including a housing 12, an elongate steering rack 14, and an input shaft 16. As shown schematically in FIG. 1, the steering gear 10 further includes a hydraulic fluid control valve 18 which is contained in the housing 12.

The rack 14 extends longitudinally through a lower portion 20 of the housing 12 along a horizontal axis 21, and is supported for movement relative to the housing 12 along the axis 21. When the steering gear 10 is installed in a vehicle, the opposite ends (not shown) of the rack 14 are connected to steering linkages which, in turn, connect the steering gear 10 to a pair of steerable vehicle wheels.

The input shaft 16 projects outward from an upper portion 22 of the housing 12 along another axis 23, and is rotatable about the axis 23 in response to rotation of the vehicle steering wheel. The steering gear 10 operates to move the rack 14 along the axis 21 in response to rotation of the input shaft about the axis 23. The steering gear thus actuates the steering linkages to steer the vehicle wheels in response to rotation of the steering wheel.

Other parts of the steering gear 10 include a pinion gear 24 and a piston 26. The pinion gear 24 is connected with the input shaft 16 by a torsion bar 28, and is supported for rotation about the axis 23 in meshing engagement with a row of rack teeth 30 on the rack 14. A tubular section 32 of the lower housing portion 20 functions as a power cylinder. The piston 26 is fixed to the rack 14 within the power cylinder 32. A pair of variable volume hydraulic fluid chambers 34 and 36 are located in the power cylinder 32 on opposite sides of the piston 26.

The valve 18 communicates with the first chamber 34 in the power cylinder 32 through a first two-way conduit 40. The valve 18 further communicates with the second chamber 36 in the power cylinder 32 through a second two-way conduit 42. As further shown schematically in FIG. 1, the valve 18 receives hydraulic fluid from a reservoir 44 and a pump 46 through an inlet conduit 48. The pump 46 could be a flow-varying pump, and could be driven by an electric motor or by the vehicle engine. An outlet conduit 50 exhausts hydraulic fluid from the valve 18 to the reservoir 44.

The valve 18 operates in response to rotation of the input shaft 16 with the vehicle steering wheel. When the input shaft 16 rotates with the steering wheel in a first direction about the axis 23, it rotates slightly relative to the pinion gear 24. The torsion bar 28 flexes to permit such rotation of the input shaft 16 relative to the pinion gear 24. The valve 18 responds to the resulting rotational displacement by opening hydraulic fluid flow paths that extend through the valve 18 from the inlet conduit 48 to the first two-way flow conduit 40. The valve 18 simultaneously opens hydraulic fluid flow paths that extend through the valve 18 from the second two-way flow conduit 42 to the outlet conduit 50. As a result, the valve 18 communicates the pump 46 with the first chamber 34 in the power cylinder 32 to pressurize the first chamber 34, and simultaneously communicates the second chamber 36 in the power cylinder 32 with the reservoir 44 to exhaust the second chamber 36. A resulting flow of hydraulic fluid from the pump 46, and a resulting hydraulic fluid pressure differential acting across the piston 26, cause the piston 26 and the rack 14 to move to the right, as viewed in FIG. 1, along the axis 21. This causes the steering linkage to steer the vehicle wheels in a first direction.

As the rack moves along the axis 21 with the piston 26, the pinion gear 24 rotates in meshing engagement with the rack teeth 30. The pinion gear 24 thus rotates about the axis 23 relative to the input shaft 16 in a follow-up manner so as to cancel the rotational displacement between the pinion gear 24 and the input shaft 16. The valve 18 responds by closing the previously opened hydraulic fluid flow paths. This equalizes the hydraulic fluid pressures acting on the piston 26 in the two chambers 34 and 36 in the power cylinder 32, and causes the piston 26 and the rack 14 to stop moving along the axis 21.

When the vehicle wheels are to be steered in an opposite direction, the input shaft 16 is rotated with the steering wheel in an opposite direction about the axis 23, and is again rotated slightly relative to the pinion gear 24 upon flexing of the torsion bar 28. The valve 18 responds by pressurizing the second chamber 36 and by simultaneously exhausting the first chamber 34. The piston 26 and the rack 14 then move axially to the left, as viewed in FIG. 1. A resulting follow-up rotation of the pinion gear 24 relative to the input shaft 16 causes the valve 18 again to equalize the hydraulic fluid pressures in the two chambers 34 and 36 in the power cylinder 32. The steering gear 10 thus steers the vehicle wheels in directions and amounts corresponding to the directions and the amounts of rotation of the steering wheel and the input shaft 16.

Figure 2:
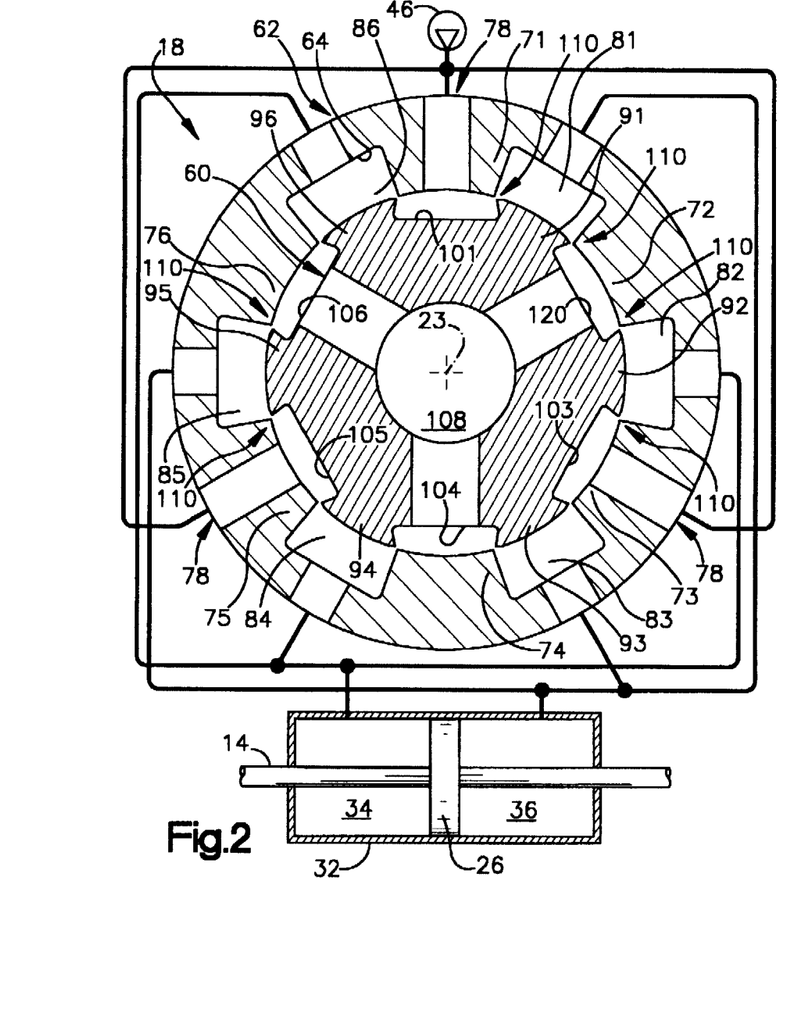
FIG. 2 is a view of parts of the apparatus of FIG. 1, with certain parts being shown in section and with other parts being shown schematically.

As shown in FIG. 2, the valve 18 includes a valve core 60 and a valve sleeve 62. Both the core 60 and the sleeve 62 have generally cylindrical shapes centered on the axis 23. The core 60 is defined by a section of the input shaft 16 (FIG. 1). The sleeve 62 is connected with an upper end portion of the pinion gear 24 (FIG. 1). Accordingly, the core 60 and the sleeve 62 rotate relative to each other when the input shaft 16 and the pinion gear 24 rotate relative to each other. As described in detail below, the core 60 and the sleeve 62 then vary the hydraulic fluid flow paths extending through the valve 18 so that certain flow paths become relatively unrestricted and certain flow paths become relatively restricted. Pressurized flows of hydraulic fluid are thereby directed through the valve 18 between the pump 46 and the chambers 34 and 36 in the power cylinder 32, as described above with reference to FIG. 1.

The sleeve 62 has a radially inner periphery 64 extending circumferentially around the core 60. The inner periphery 64 of the sleeve 62 has an undulating contour defined by a plurality of circumferentially spaced lands and grooves. Specifically, the sleeve 62 has six lands 71, 72, 73, 74, 75 and 76 which are equally spaced from each other circumferentially about the axis 23. The sleeve 62 further has six grooves 81, 82, 83, 84, 85 and 86, each of which is located circumferentially between a pair of adjacent lands.

Three inlet ports 78 extend radially inward through the sleeve 62 at the locations of the first land 71, the third land 73, and the fifth land 75. As shown schematically in FIG. 2, the inlet ports 78 receive hydraulic fluid from the pump 46.

As further shown schematically in FIG. 2, the grooves 81–86 on the sleeve 62 communicate with the fluid chambers 34 and 36 in the power cylinder 32. The first, third and fifth grooves 81, 83 and 85 communicate with the chamber 36 on the right side of the piston 26, as viewed in FIG. 2. The second, fourth and sixth grooves 82, 84 and 86 communicate with the other chamber 34 on the left side of the piston 26.

The core 60 also has an undulating contour defined by a plurality of lands and grooves. These include six lands 91–96 and six grooves 101–106. The lands 91–96 on the core 60 are located radially opposite the grooves 81–86 on the sleeve 62. The grooves 101–106 on the core 60 are located radially opposite the lands 71–76 on the sleeve 62. Accordingly, the adjacent corners of the lands 71–76 and 91–96 define orifices 110 between the grooves 81–86 and 101–106. Three of the grooves 102, 104 and 106 on the core 60 communicate with the reservoir 44 (FIG. 1) through corresponding branches of a return port system 108 within the core 60.

When a steering maneuver is not being performed, the core 60 and the sleeve 62 are located in neutral positions, as shown in FIG. 2. Hydraulic fluid then flows from the inlet ports 78 to the return port system 108 through the grooves 101–106, the grooves 81–86, and the orifices 110. This flow results from a pressure drop between the pump 46 and the reservoir 44. However, there is no pressure differential between the chambers 34 and 36 in the power cylinder 32 when a steering maneuver is not being performed. Accordingly, there is no pressure differential between the set of grooves 81, 83 and 85 that communicate with the right chamber 36 and the other set of grooves 82, 84 and 86 that communicate with the left chamber 34.

Figure 3:
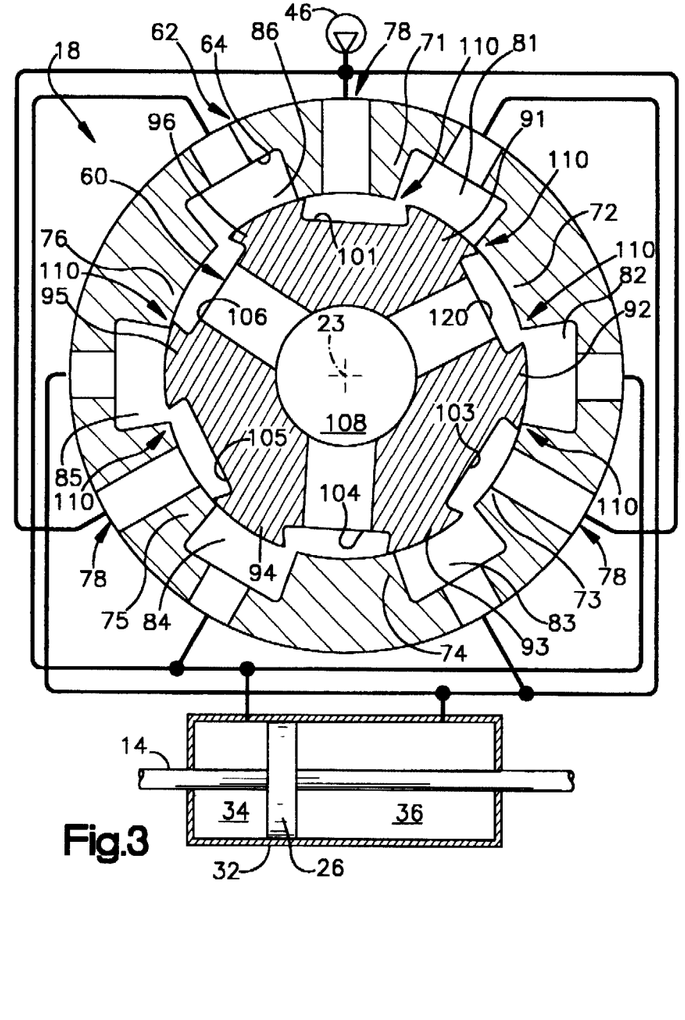
FIG. 3 is a view similar to FIG. 2 showing parts in different positions.

When the vehicle steering wheel and the input shaft 16 (FIG. 1) are turned to the right, the core 60 rotates relative to the valve sleeve 62 in a clockwise direction, as viewed in FIGS. 2 and 3. Six of the twelve orifices 110 are then enlarged, and the other six orifices 110 are simultaneously constricted. This causes the hydraulic fluid pressure to increase in the set of grooves 81, 83 and 85 that communicate with the right chamber 36 in the power cylinder 32, and simultaneously causes the hydraulic fluid pressure to decrease in the set of grooves 82, 84 and 86 that communicate with the left chamber 34. A small portion of the hydraulic fluid flow extending from the inlet ports 78 to the return port system 108 is thus diverted to the right chamber 36 through the grooves 81, 83 and 85. An equal flow of hydraulic fluid is simultaneously exhausted from the left chamber 34 to the other grooves 82, 84 and 86. The piston 26 and the rack 14 then move to the left, as viewed in FIG. 3. This causes the steering linkages to turn the steerable vehicle wheels to the right.

When a steering maneuver is being performed in the foregoing manner, the changing hydraulic fluid pressures within the valve 18 can generate noise. In particular, noise can be generated by the changing pressure drops across the orifices 110. In accordance with the present invention, the lands 91–96 on the core 60 are shaped to reduce noise generated by the changing pressure drops across the orifices 110.

Figure 4:
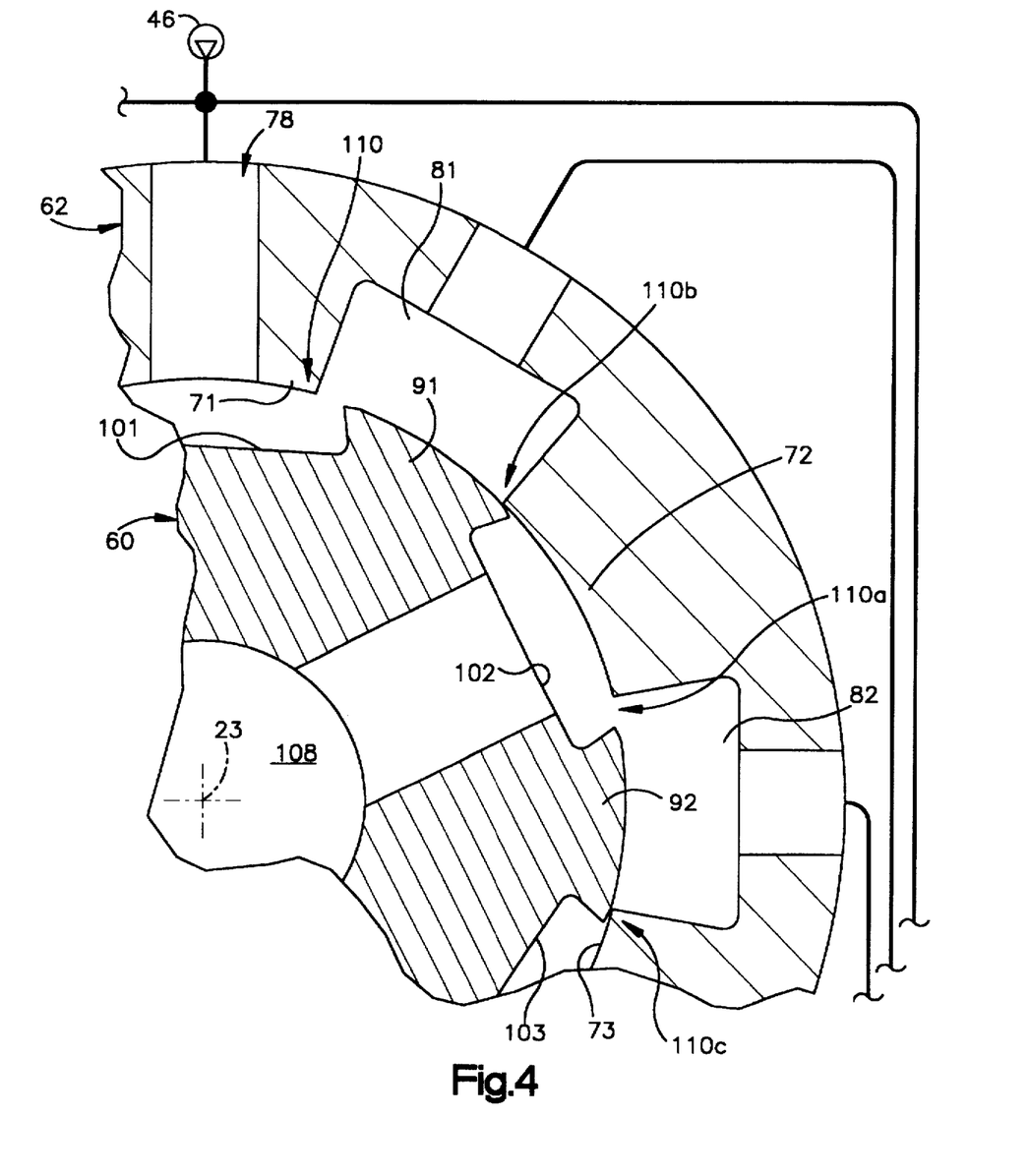
FIG. 4 is an enlarged partial view of parts shown in FIG. 3.

As shown in the enlarged view of FIG. 4, one of the orifices 110 that enlarges is differentiated from two of the orifices 110 that constrict upon rotation of the core 60 from the neutral position of FIG. 2 to the shifted position of FIG. 3. Specifically, one of the enlarging orifices 110 is designated by the reference number 110a in FIG. 4. An adjacent pair of constricting orifices 110 are designated by the reference numbers 110b and 110c. Those constricting orifices 110b and 110c are located in parallel between the inlet ports 78 and the return port system 108. In accordance with the present invention, the corresponding lands 91 and 92 on the core 60 are shaped so that the pair of constricting orifices 110b and 110c initially constrict at unequal rates, and subsequently constrict at equal rates until reaching fully constricted conditions, when the core 60 is rotated from the neutral position of FIG. 2 to the shifted position of FIG. 3. This reduces the amount of noise that is generated by the changing pressure drops across those constricting orifices 110b and 110c.

Figure 5:
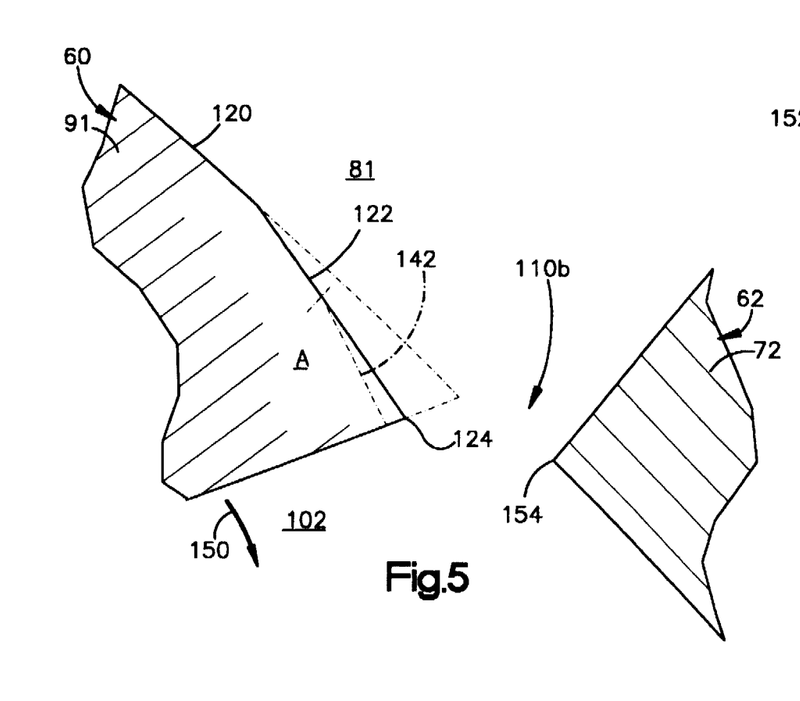
FIGS. 5 and 6 are enlarged partial views of parts shown in FIG. 4.

The first constricting orifice 110b of FIG. 4 is shown in enlarged detail in FIG. 5, with the core 60 and the sleeve 62 being shown in the neutral positions. The orifice 110b is a gap between the first land 91 on the core 60 and the second land 72 on the sleeve 62.

As shown in FIG. 5, the first land 91 on the core 60 has a cylindrical surface 120. The cylindrical surface 120 has a circular radial contour centered on the axis 23 (FIGS. 2–4). The first land 91 on the core 60 further has a planar edge surface or facet 122. The facet 122 is inclined radially inward from the cylindrical surface 120, and extends from the cylindrical surface 120 to the corner 124 of the land 91 beside the adjacent groove 102. The contour of the land 91 is thus tapered radially inward from the cylindrical surface 120 to the corner 124.

Figure 6:
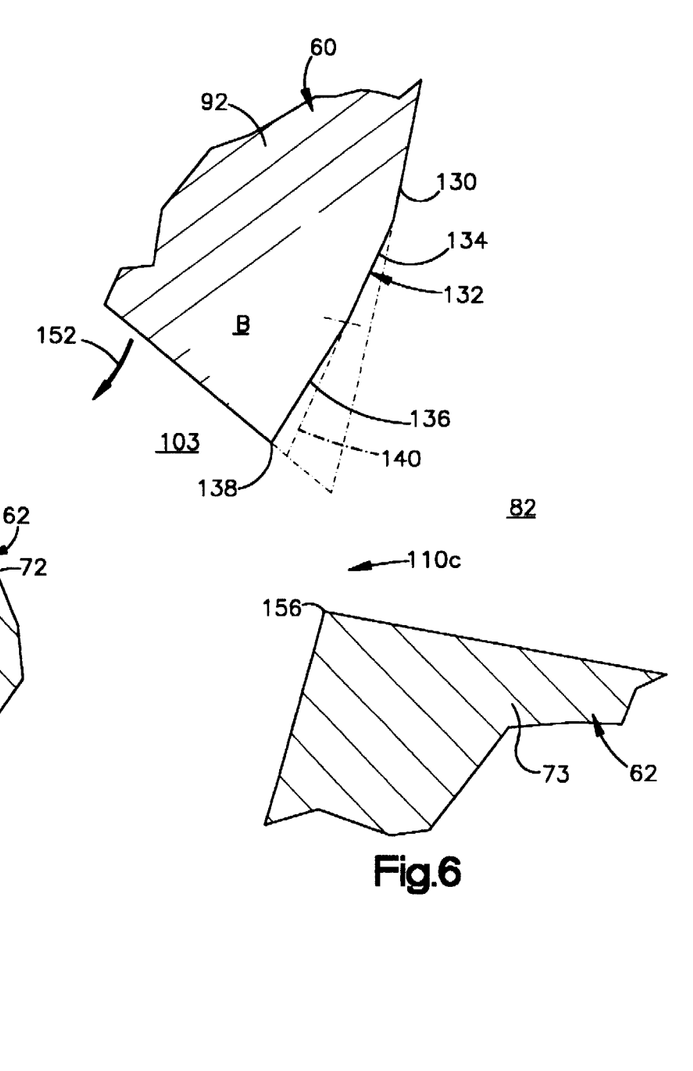

The second constricting orifice 110c of FIG. 4 is shown in enlarged detail in FIG. 6, also with the core 60 and the sleeve 62 being shown in the neutral positions. The orifice 110c is a gap between the second land 92 on the core 60 and the third land 73 on the sleeve 62.

The second land 92 on the core 60 also has a cylindrical surface 130 with a circular radial contour centered on the axis 23. The second land 92 further has an edge surface 132 with two discreet planar facets 134 and 136 which are inclined radially inward from the cylindrical surface 130, and which extend successively from the cylindrical surface 130 to the corner 138 of the land 92 beside the adjacent groove 103. The second facet 136 is inclined and extends radially inward from the first facet 134. The second land 92 thus has a tapered contour beside the orifice 110c which differs from the tapered contour of the first land 91 beside the orifice 110b. This is indicated in FIG. 6 by a dashed line 140 which shows the edge surface 122 of the first land 91 superimposed on the edge surface 132 of the second land 92. FIG. 5 similarly has a dashed line 142 showing the edge surface 132 of the second land 92 superimposed on the edge surface 122 of the first land 91. As shown by comparison of FIG. 5 with FIG. 6, the angle of radially inwardly inclination and the radially inward spacing of the facet 134 are the same as the angle of radially inward inclination and the radially inward spacing of the facet 122.

The orifices 110b and 110c simultaneously begin to constrict as the first and second lands 91 and 92 on the core 60 begin to move relative to the sleeve 62 in the directions indicated by the arrows 150 and 152 shown in FIGS. 5 and 6. This occurs when the core 60 is rotated from the neutral position of FIG. 2 toward the shifted position of FIG. 3. During an initial amount of such rotation, the corners 124 and 138 of the lands 91 and 92 move downward, as viewed in FIGS. 5 and 6, toward and past the opposed corners 154 and 156 on the sleeve 62, respectively. The orifice 110b of FIG. 5 constricts faster than the orifice 110c of FIG. 6 during this initial amount of rotation of the core 60.

In a next successive amount of rotation of the core 60, the edge surfaces 122 and 132 of the lands 91 and 92 move past the corners 154 and 156 on the sleeve 62. As the second facet 136 of the edge surface 132 moves past the corresponding corner 156 in this manner, the orifice 110c closes faster than the orifice 110b. This is because the second facet 136 at the orifice 110c is inclined and spaced radially inward more than the facet 122 at the orifice 110b.

In a next successive amount of rotation of the core 60, the first facet 134 of the edge surface 132 moves past the corner 156 on the sleeve 62, and the remaining portion of the facet 122 simultaneously moves past the corresponding corner 154. Since the facets 122 and 134 have the same angle of radially inward inclination, and are equally spaced radially inward from the concentric cylindrical surfaces 120 and 130, the orifices 110b and 110c constrict at equal rates during this amount of rotation of the core 60. The amount of noise generated in the valve 18 is greatly reduced by varying the rates at which the orifices 110b and 110c constrict in this manner.

Figure 7:
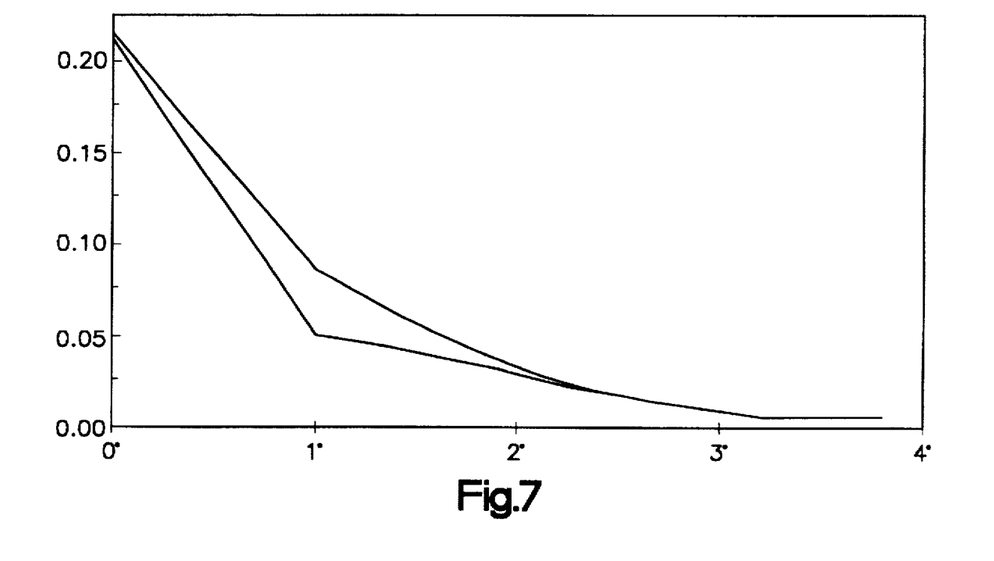
FIG. 7 is a graph showing performance characteristics of the apparatus of FIG. 1.

FIG. 7 is a graph showing the varying rates at which the orifices 110 can constrict in accordance with the present invention. The angle of rotation of the core 60 from the neutral position is measured in degrees on the horizontal axis of FIG. 7. The sizes (widths) of the gaps defined by the orifices 110 are measured in millimeters on the vertical axis of FIG. 7. One of the lines plotted on FIG. 7 represents measurements taken at an orifice like the orifice 110b of FIG. 5. The other line plotted on FIG. 7 represents measurements taken at an orifice like the orifice 110c of FIG. 6. The orifice 110b is thus shown to constrict faster than the orifice 110c during the initial amount of rotation of the core 60 when the corners 124 and 138 of the lands 91 and 92 are moving toward the opposed corners 154 and 156 of the sleeve 62. This preferably comprises approximately 1° of rotation of the core 60 from the neutral position.

As further shown in FIG. 7, the orifice 110c constricts faster than the orifice 110b during the next successive amount of rotation of the core 60. This results from the relatively greater inclination and radially inward spacing of the facet 136 on the second land 92, as described above, and preferably continues throughout approximately 1.2° of continued rotation of the core 60 in the same direction. The orifices 110b and 110c subsequently close at equal rates as a result of the equal inclination of the facets 134 and 122. This preferably continues throughout approximately 0.9 degrees more of continued rotation of the core 60 in the same direction. No further constriction of the orifices 110b and 110c occurs as the concentric cylindrical surfaces 120 and 130 of the lands 91 and 92 move simultaneously beside the opposed corners 154 and 156 of the sleeve 62. The orifices 110b and 110c thus reach fully constricted conditions simultaneously.

Figure 8:
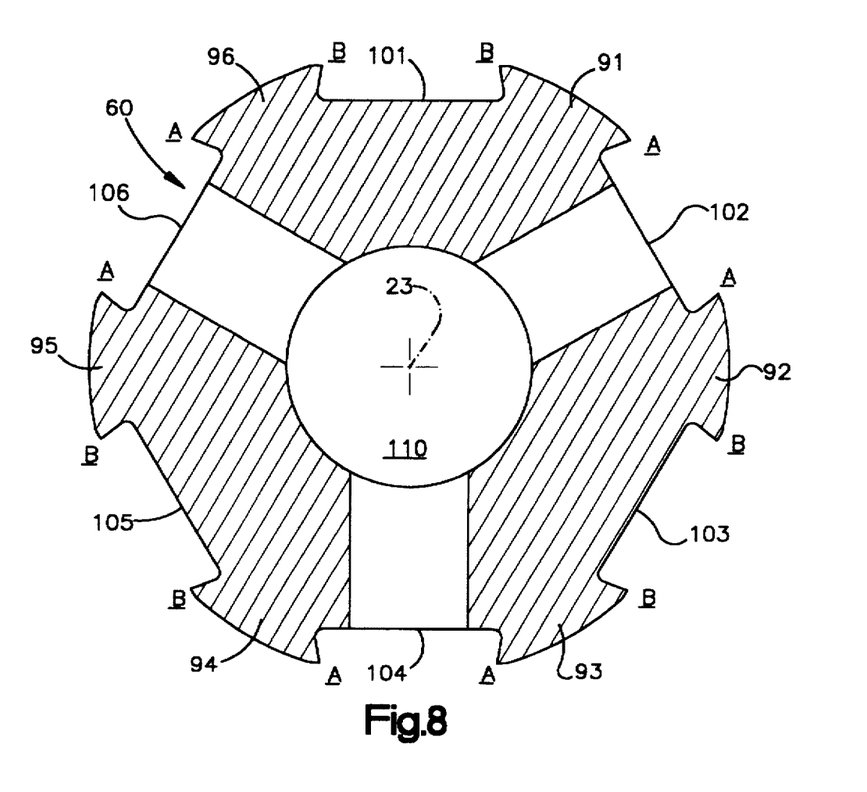
FIG. 8 is a view of a part shown in FIGS. 2 and 3.

As further shown in FIGS. 5 and 6, the contour of the first land 91 adjacent to the corner 124 is designated by the letter A. The contour of the second land 92 adjacent the corner 138 is similarly designated by the letter B. FIG. 8 shows the preferred locations where those contours are repeated about the circumference of the core 60. Specifically, each of the lands 91–96 on the core 60 has the contour designated A at one side of the land, and has the contour designated B at the circumferentially opposite side of the land. In this arrangement, when any one of the orifices 110 (FIGS. 2 and 3) enlarges, the pair of adjacent orifices 110 (i.e., the two orifices on circumferentially opposite sides of the enlarging orifice) constrict at the varying rates described above with references to FIGS. 5 and 6. This ensures that noise is reduced throughout the entire circumference of the valve 18.

Figure 9:
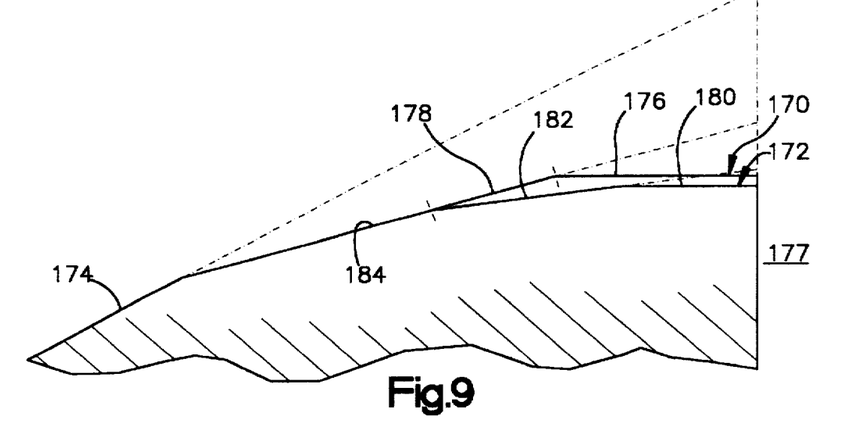
FIG. 9 is a partial view of an apparatus comprising a second embodiment of the present invention.

FIG. 9 shows a superimposed pair of edge surfaces 170 and 172 that can be used as alternatives for the edge surfaces 122 and 132 of FIGS. 5 and 6. The edge surfaces 170 and 172 of FIG. 9 are inclined radially inward from a cylindrical surface 174 which is centered on the axis of rotation (not shown). Both of the edge surfaces 170 and 172 have initially constricting portions for causing corresponding orifices to constrict at unequal rates, and further have subsequently constricting portions for causing the orifices subsequently to constrict at equal rates until reaching fully constricted conditions, in accordance with the present invention.

The edge surface 170 includes a first planar facet 176 extending from a corner at the edge of an adjacent groove 177. The first planar facet 176 functions as an initially constricting portion of the edge surface 170 in accordance with the present invention. The edge surface 170 further includes a second planar facet 178 which functions as a subsequently constricting portion of the edge surface 170.

The other edge surface 172 shown in FIG. 9 has a first and second planar facets 180 and 182 which function successively as an initially constricting portions of the edge surface 172, and further has a third planar facet 184 which functions as a subsequently constricting portion. The first facet 182 of the edge surface 172 is spaced radially inward relative to the first facet 176 of the edge surface 170, but has the same angle of radially inward inclination. The third facet 184 of the edge surface 172 has the same radially inward spacing and angle of inclination as the second facet 178 of the edge surface 170.

Figure 10:
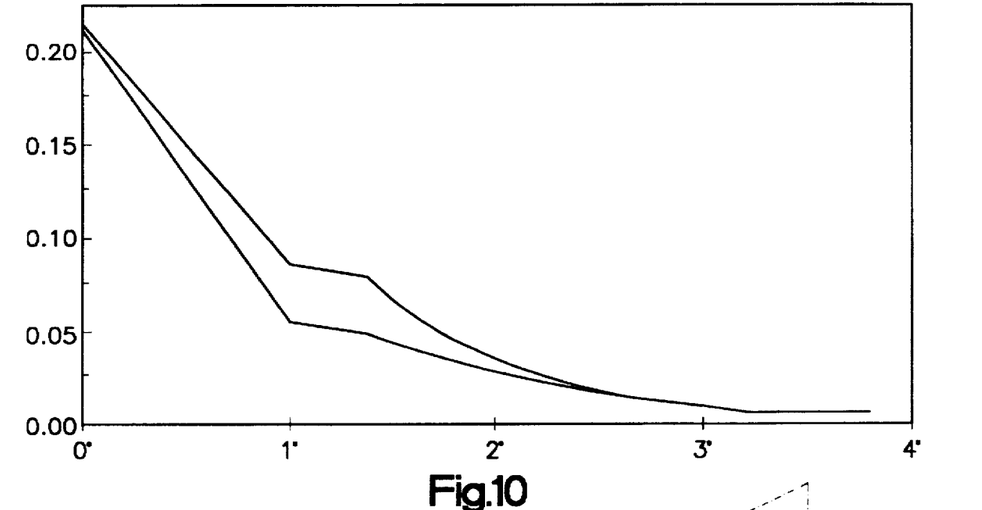
FIG. 10 is a graph showing performance characteristics of the apparatus of FIG. 9.

Since the facets 176 and 180 of FIG. 9 are parallel along the length of the facet 180, they cause corresponding orifices to constrict at equal rates when they act together. This is indicated in FIG. 10 by the parallel curve sections extending from approximately 1° to approximately 1.4°.

Figure 11:
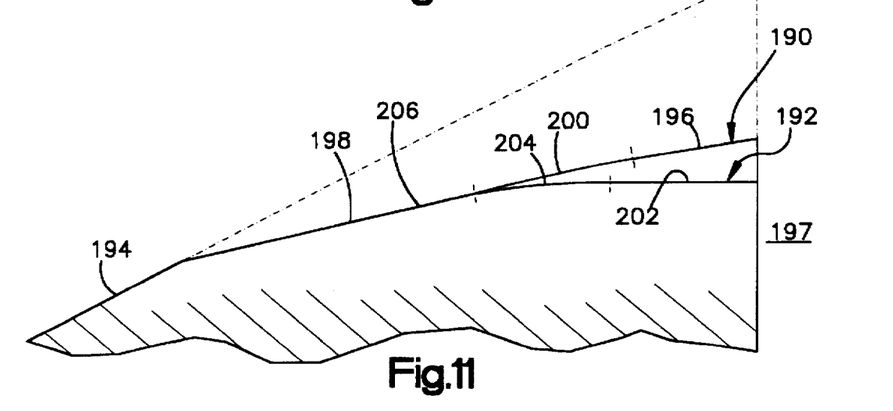
FIG. 11 is a partial view of an apparatus comprising a third embodiment of the present invention.

FIG. 11 also shows a superimposed pair of edge surfaces 190 and 192 that can be used as alternatives for the edge surfaces 122 and 132 of FIGS. 5 and 6. Both of the edge surfaces 190 and 192 of FIG. 11 are inclined radially inward from a cylindrical outer surface 194 which is centered on the axis of rotation (not shown). The edge surface 190 includes a first planar facet 196 extending from a corner at the edge of an adjacent groove 197, and further includes a second planar facet 198 extending oppositely from the cylindrical surface 194 toward the groove 197. A cylindrical intermediate portion 200 of the edge surface 190 extends in an arc between the two facets 196 and 198. The facets 196 and 198 are tangential to the intermediate surface portion 200. The first facet 196 and the intermediate portion 200 function successively as initially constricting portions of the edge surface 190 in accordance with the present invention. The second planar facet 198 functions as a subsequently constricting portion of the edge surface 190.

The other edge surface 192 shown in FIG. 11 has a first planar facet 202, a cylindrical intermediate portion 204, and a second planar facet 206. The facets 202 and 206 are tangential to the intermediate surface portion 204. The first facet 202 and the intermediate surface portion 204 are inclined and spaced radially inward from the cylindrical surface 194 more than the corresponding portions 196 and 200 of the other edge surface 190, and function successively as initially constricting portions of the edge surface 192 in accordance with the present invention. The second facet 206 of the edge surface 192 has the same size, angle of inclination, and radially inward spacing as the second facet 198 of the other edge surface 190, and likewise functions as a subsequently constricting portion of the edge surface 192 in accordance with the present invention.

From the above description of the invention, those skilled in the art will perceive improvements, changes and modifications. For example, the present invention is equally applicable to a relatively rotatable valve part having more or less than six lands and grooves. Such improvements, changes and modifications within the skill of the art are intended to be covered by the appended claims.

Having described the invention, the following is claimed:

1. Apparatus comprising:

first and second valve members rotatable relative to each other about an axis;

said valve members comprising means for defining hydraulic fluid flow orifices which are spaced apart circumferentially about said axis, said orifices being variable in size such that an orifice enlarges when an adjacent pair of orifices constrict upon relative rotation of said valve members from neutral positions;

said pair of constricting orifices initially constricting at unequal rates, and subsequently constricting at equal rates until reaching fully constricted conditions.

2. Apparatus as defined in claim 1 wherein said pair of constricting orifices reach said fully constricted conditions simultaneously.

3. Apparatus as defined in claim 1 wherein one of said pair of constricting orifices first constricts faster and then constricts slower, as compared with the other orifice in said pair, before constricting at the same rate as said other orifice in said pair.

4. Apparatus as defined in claim 1 wherein said first valve member has a generally cylindrical shape with a plurality of axially extending lands and grooves, each of said lands having a cylindrical surface extending circumferentially between first and second opposite edge surfaces, said first edge surface having a first contour, said second edge surface having a second, different contour.

5. Apparatus as defined in claim 4 wherein said first and second contours are tapered radially inward from said cylindrical surface.

6. Apparatus as defined in claim 4 wherein said first and second edge surfaces have initially constricting portions adjacent to a corresponding pair of said grooves, said initially constricting portions having unequally tapered contours.

7. Apparatus as defined in claim 6 wherein said first and second edge surfaces further have subsequently constricting portions between said cylindrical surface and said initially constricting portions, said subsequently constricting portions having equally tapered contours.

8. Apparatus as defined in claim 7 wherein said initially and subsequently constricting portions of said edge surfaces are planar facets, said edge surfaces further having arcuate intermediate portions between said planar facets.

9. Apparatus as defined in claim 8 wherein said second valve member comprises a valve sleeve centered on said axis, said first valve member comprising a valve core located concentrically within said valve sleeve.

\* \* \* \* \*